United States Patent [19]

Takata et al.

[11] Patent Number: 4,693,521

[45] Date of Patent: Sep. 15, 1987

[54] AUTOMOBILE BRAKING FORCE CONTROL APPARATUS

[75] Inventors: Koji Takata; Yukinori Nishiyama, both of Itami, Japan

[73] Assignee: Sumitomo Electric Industries, Ltd., Osaka, Japan

[21] Appl. No.: 801,139

[22] Filed: Nov. 22, 1985

[30] Foreign Application Priority Data

Dec. 12, 1984 [JP] Japan .................. 59-261969

[51] Int. Cl.⁴ .............................................. B60T 8/00
[52] U.S. Cl. ..................................... 303/103; 60/566; 60/579; 303/92; 303/114
[58] Field of Search ................. 60/563, 565, 566, 579; 303/100, 102, 103, 106, 110, 111, 114, 116, 92

[56] References Cited

U.S. PATENT DOCUMENTS 3,756,666  9/1973  Leiber ............................ 303/116 X
3,999,808 12/1976  Belart ............................. 303/116 X

FOREIGN PATENT DOCUMENTS 9791  3/1977  Japan .

OTHER PUBLICATIONS

Japanese Patent Application Laid-Open No. 39876/1972.

Japanese Patent Application 182997/1984.

Primary Examiner—Duane A. Reger
Attorney, Agent, or Firm—W. G. Fasse; D. H. Kane, Jr.

[57] ABSTRACT

An automobile braking force control apparatus controls braking forces on some or all of the wheels individually or in groups. The operating force from a brake pedal (2) is converted into a hydraulic pressure by a master cylinder (3). This converted hydraulic pressure acts on the pistons of actuators (7a, 7b, 7c, 7d) disposed in operating channels (6a, 6b, 6c, 6d) leading to some or all of the wheels taken individually or in groups. The braking force on the wheels vary with the movements of the pistons. Auxiliary power circuits (8a, 8b, 8c, 8d, 9a, 9b, 9c, 9d) are provided for enabling hydraulic pressure from an auxiliary power source (12) to act on the pistons of the actuators (7a, 7b, 7c, 7d). Control valves (10a, 10b, 10c, 10d) controled by an electronic control device (13) are disposed in auxiliary power circuits. In addition to the hydraulic pressure from the master cylinder (3), the pistons of the actuators (7a, 7b, 7c, 7d) are acted on by the auxiliary hydraulic pressures from the auxiliary power source (12) in both positive and negative directions, after these pressures have been controlled to suitable magnitudes by the control valves (10a, 10b, 10c, 10d).

8 Claims, 3 Drawing Figures

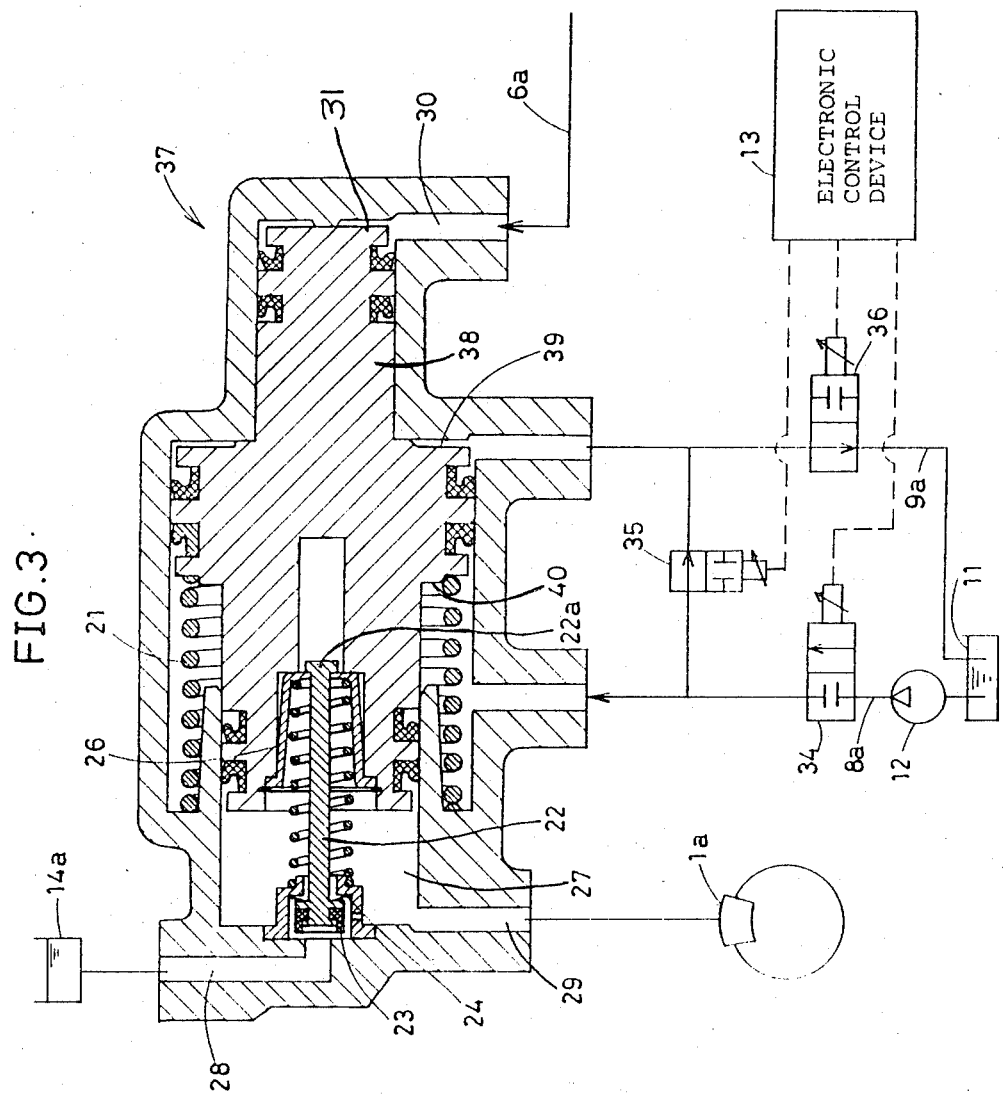

AUTOMOBILE BRAKING FORCE CONTROL APPARATUS

BACKGROUND OF THE INVENTION

This invention relates to an automobile braking force control apparatus. The present braking force control apparatus is particularly adapted for controlling the braking forces applied to some or all of the wheels individually or in groups.

DESCRIPTION OF THE PRIOR ART

In recent years, there has been a need for controlling the braking force applied to each wheel of a vehicle by utilizing an electronic control device in order to improve the braking force application and thus the safety of automobiles. Braking force control apparatuses intended to meet this need have already been disclosed in Japanese Patent Publication No. 9791/1977 and Japanese Patent Application Laid-Open No. 39876/1972. In Japanese Patent Publication No. 9791/1977, a bidirectionally controlled vacuum cylinder adapted to vary a braking force is used in each operating channel leading to each wheel. Each vacuum cylinder has a solenoid valve leading to a high pressure side of a pressure source and a solenoid valve leading to a low pressure side for pressure increasing purposes, and a solenoid valve leading to a high pressure side and a solenoid valve leading to a low pressure side for pressure reducing purposes. Therefore, four vacuum cylinders and sixteen solenoid valves are required for an independent control of four wheels. In Japanese Patent Application Laid-Open No. 39876/1972, two unidirectonally controlled vacuum cylinders, one for pressure increasing purposes and the other for pressure reducing purposes, each having a hydraulic brake pressure cut-off valve and a solenoid valve, are used for each operating channel. Thus, eight vacuum cylinders are required for an independent four wheel control.

When each channel leading to its associated wheel is taken into consideration, the aforesaid conventional braking force control apparatuses may not cause any particular problem from the standpoint of function. However, if each wheel of a four-wheeled automobile is to be independently controlled, prior art devices will be greatly increased in size. That is, according to Japanese Patent Publication No. 9791/1977, a total of sixteen solenoid valves are required for four operating channels, while according to Japanese Patent Application Laid-Open No. 39876/1972, a total of eight vacuum cylinders are required for four operating channels. Further, in Japanese Patent Publication No. 9791/1977, the brake pedal portion and actuator are interconnected only by electronic commands through an electronic control device. Thus, an inherent problem is that if a trouble should occur in the electronic control system or power system (vacuum system, in this case), the braking force is lost completely.

SUMMARY OF THE INVENTION

Accordingly, it is an object of this invention to provide an automobile braking force control apparatus which is relatively simple as a whole and which has been reduced in weight and size. The apparatus is to assure a continuous ability to apply a braking force even if trouble occurs in the electronic control system or in the power supply system, whereby an operating force for the braking device is produced by operating the brake pedal.

The present automobile braking force control apparatus controls braking forces applied to some or all of the wheels individually or in groups. An operating force produced by the manually operating means, hereinafter typically illustrated as a brake pedal, is converted into a hydraulic pressure by a master cylinder. This hydraulic pressure acts on the pistons of actuators each disposed in an operating channel leading to one or more associated wheel brakes. The braking force on the wheel varies according to the movement of said piston. Auxiliary power circuits are provided so that hydraulic pressures produced by auxiliary power may respectively act on the pistons of the actuators. A control valve is disposed in each auxiliary power circuit and is controlled by an electronic control device. The piston of each actuator is acted on by hydraulic pressure from the master cylinder and it can also be acted on by auxiliary hydraulic pressure from an auxiliary power source in both positive and negative directions after said auxiliary hydraulic pressure has been controlled to a suitable magnitude by the control valve.

According to this invention, a simple combination of an actuator and a control valve is provided for each operating channel, thereby performing all the principal control modes, including manual application, electronic application, manual application and electronic addition, and, manual application and electronic subtraction. Thus, the present braking force control apparatus is relatively simple and has reduced weight and reduced size yet achieves the mentioned function.

BRIEF DESCRIPTION OF THE DRAWINGS

FIG. 3 is a view showing another example of an actuator and its related arrangement as used in this invention.

DESCRIPTION OF THE PREFERRED EMBODIMENTS AND OF THE BEST MODE OF THE INVENTION

Figure 1:
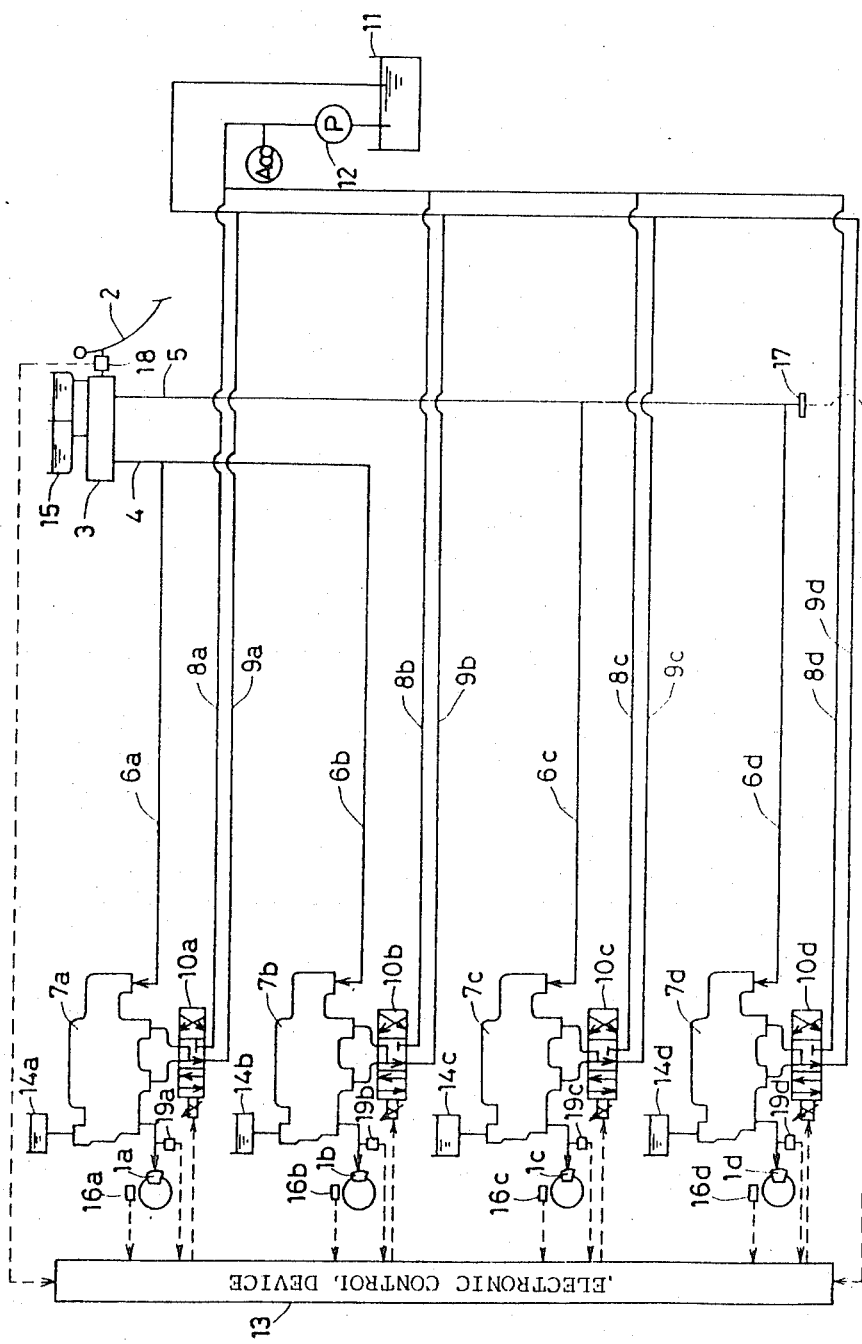
FIG. 1 is a schematic view of an embodiment of this invention.

The automobile braking force control apparatus according to the invention shown schematically in FIG. 1 permits controlling the braking forces on the wheels of a four-wheeled vehicle independently of one another. In the figure, the brakes for the wheels are shown at 1a, 1b, 1c and 1d and the brake pedal at 2. A master cylinder 3 is connected to the brake pedal 2. An operating force on the braking pedal 2 is converted into a hydraulic pressure by the master cylinder 3. Usually, the output from the master cylinder 3 is delivered to two circuits 4 and 5 to provide a higher safety. One circuit 4 branches into two operating channels 6a and 6b. Similarly, the other circuit 5 branches into two operating channels 6c and 6d. The operating channels 6a, 6b, 6c and 6d communicate with the wheel brakes 1a, 1b, 1c and 1d, respectively. The operating channels 6a, 6b, 6c and 6d have actuators 7a, 7b, 7c and 7d respectively installed therein, which are capable of applying braking forces directly to the brakes 1a, 1b, 1c and 1d, respectively.

The hydraulic pressure produced by the master cylinder acts on the pistons of the actuators 7a, 7b, 7c and 7d installed on their respective operating channels. The outputs from the actuators 7a, 7b, 7c and 7d are introduced into the brakes 1a, 1b, 1c and 1d, respectively, to produce braking forces.

As shown, auxiliary power circuits 8a, 8b, 8c, 8d and 9a, 9b, 9c, 9d are provided so that hydraulic pressures produced by auxiliary power source 12 may act on the pistons of the actuators 7a, 7b, 7c, 7d. One group of auxiliary power circuits 8a, 8b, 8c and 8d leads to the high pressure side of the power source 12 and the other group of auxiliary circuits 9a, 9b, 9c and 9d leads to a low pressure side formed by a tank 11. Control valves 10a, 10b, 10c and 10d are installed in auxiliary power circuits leading to the wheels. The control valves 10a, 10b, 10c and 10d used in this embodiment are directional flow control valves. The auxiliary power source 12 is, e.g., a pump connected to said tank 11 for pressurizing the working fluid. The pressurized fluid is then introduced into the control valves 10a, 10b, 10c and 10d. The control valves 10a, 10b, 10c and 10d are independently controlled by an electronic control device 13. Further, the control valves 10a, 10b, 10c and 10d are connected through two liquid circuits to the actuators 7a, 7b, 7c and 7d, respectively. Thus, the pistons of the actuators 7a, 7b, 7c and 7d are acted on by a hydraulic pressure from the master cylinder 3 and these pistons can also be acted on by auxiliary hydraulic pressures from the auxiliary power source in both positive and negative directions, after these pressures have been controlled to suitable magnitudes by the control valves 10a, 10b, 10c and 10d. Therefore, even if the actuators 7a, 7b, 7c and 7d receive no input from the master cylinder 3, it is still possible for these actuators to deliver output pressures due to the operation of the control valves 10a, 10b, 10c and 10d.

It is not desirable to introduce two types of fluids such as liquids into the actuators 7a, 7b, 7c and 7d. Thus, it is preferable that the liquid used in the brake system be of the same type as that used in the auxiliary power system. In the illustrated example, the actuators, 7a, 7b, 7c and 7d have their respective reservoirs 14a, 14b, 14c and 14d independent of each other. However, these individual reservoirs may be replaced by a one-piece or single reservoir having suitable partitions. Alternatively, the reservoirs for the respective actuators may be united with the reservoir 15 for the master cylinder or with the tank 11.

The electronic control device 13 has various items of information inputted therein. On the basis of these information items it suitably actuates the control valves 10a, 10b, 10c and 10d. More particularly, the respective rotations of the wheels are monitored by respective rotation sensors 16a, 16b, 16c and 16d, while the electronic control device 13 controls the control valves 10a, 10b, 10c and 10d in such a manner as to obtain a desired rotative situation in each wheel.

The electronic control device 13 is also supplied with information indicating the magnitudes of a manual application. A hydraulic pressure sensor 17 senses the pressure provided by a master cylinder. A force sensor 18 senses the force applied to the brake pedal 2 or to a push rod which interconnects the brake pedal 2 and the piston of the master cylinder 3. Further, to obtain a better control, it is preferable in many cases to sense output pressures from the actuators 7a, 7b, 7c and 7d by sensors 19a, 19b, 19c and 19d and to input the signals into the electronic control device 13. In such a case, it is advantageous from the standpoint of cost to use a pressure sensor 17 which of the same type is that of the sensors 19a, 19b, 19c and 19d. If, however, the time lag and hysteresis of the master cylinder 3 are considered, the sensor 18 which directly measures the operating force applied to the brake pedal 2 is more advantageous from the standpoint of performance. To further improve the control, it is possible to add various sensors as desired, such as a vehicle deceleration sensor, a relative-to-ground vehicle velocity sensor, a brake torque sensor for each wheel, a load sensor for each wheel, and an auxiliary power pressure sensor associated with each of the outputs of the control valves 10a, 10b, 10c and 10d, i.e., each of the actuators 7a, 7b, 7c and 7d. It is also possible to add an accelerator pedal switch and a clutch pedal switch and to receive information from the engine control system, suspension control system and steering control system. Information from these additional sensors and switches or other electronic control elements will bring the momentarily varying target braking pressures for each wheel or for each group of wheels set by the electronic control device 13, closer to the ideal. To cope with any prior arts or future improvements on the electronic control device 13, which is intended by this invention lies in faithfully and simply utilizing outputs from this known electronic control device to produce braking pressures.

Figure 2:
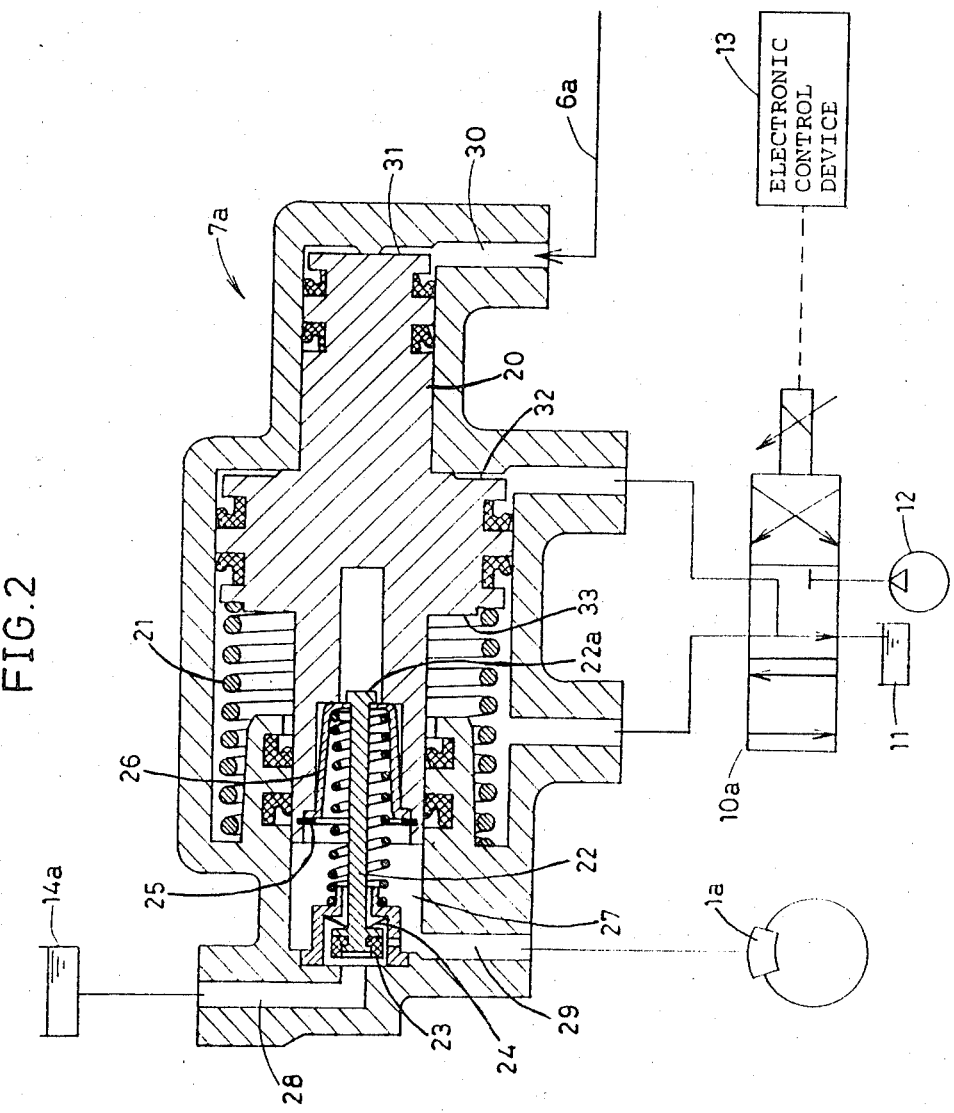
FIG. 2 is a view showing an example of an actuator and its related arrangement as used in this invention.

In the operational state of the actuator 7a illustrated in FIG. 2, the brake pedal 2 has not been operated and the liquid pressurized by the pump 12 has its flow path cut off. Therefore, the piston 20 of the actuator 7a is positioned at the rightmost end as shown in FIG. 2. In addition, the piston 20 is constantly urged by the return spring 21 to move to the right.

Referring to FIG. 2, the control valve 10a can assume any one of three valve positions. The central position is shown in FIG. 2. From the central position the valve body can move to the right or to the left from the viewer's point of view. When the body of the control valve 10a is moved into the right valve end position, the liquid flows from the pump 12 toward the right-hand side annular surface 32 of the piston 20 and the liquid is permitted to flow from the left-hand side annular surface 33 of the piston 20 toward the tank 11 since the piston 20 will move from right to left. When the valve body reaches the shown central position the fluid cannot flow from the pump 12 toward the actuator 7a but the liquid can flow from the actuator 7a into the tank 11. When the body of the control valve 10a is moved into the left end position, the liquid flows from the pump 12 to the left-hand side annular surface 33 of the piston 20 and the liquid from the right-hand side annular surface 32 of the piston 20 flows back into the tank 11. The control valves 10b, 10c and 10d operate in the same manner as the control valve 10a.

As shown, the left-hand end portion of the piston 20 has a slide pin 22 slidably received therein. The slide pin 22 has a rubber seat 23 fixed to the left-hand end thereof and is urged by a plate spring 24 to move to the left as seen in FIG. 2. The right-hand end 22a of the slide pin 22 is engaged with a U-shaped member 26 which is fixed to the left-hand end of the piston 20 through a snap ring 25, whereby the leftward movement of the slide pin is inhibited. In this state, the left-hand end surface of the pin 22, i.e., the left-hand end surface of the rubber seat 23 is separated from the wall surface, which means that the flow path for the liquid from the reservoir 14a is open. When the piston 20 is slightly moved leftward from this state, the right-hand end 22a of the slide pin 22 is disengaged from the U-shaped member 26, whereby the slide pin 22 is moved leftward under the action of the plate spring 24. Thereafter, the flow path for the liquid from the reservoir 14a is closed by an increase in the pressure in a chamber 27 located to the left of the piston 20. As is clear from the foregoing description, with the illustrated actuator 7a, the combination of the arrangement related to the slide pin 22 (which is a known center valve) and the return spring 21 makes it possible to maintain the original state when all applied pressures, ie, master cylinder pressure and auxiliary pressure, are released. In the original state, a port 28 leading to the reservoir 14a communicates with a port 29 leading to the brake 1a.

The liquid pressurized by operating the brake pedal 2 is introduced into the actuator 7a through a port 30 whereby the right-hand side small diameter surface 31 of the piston 20 is subjected to pressure. Additionally, auxiliary pressure is applied to the right-hand side annular surface 32 or left-hand side annular surface 33 of the piston according to the position of the control valve 10a as described above. Therefore, the pressure of the pressure of the liquid delivered through the port 29 to the brake 1a depends on the force of the pressure from the master cylinder plus or minus the force of the auxiliary pressure. That is, the combination of the actuator 7a and control valve 10a makes it possible to establish the following 4 states. The first state is a state wherein the brake pedal 2 is used alone to brake the wheels, when the auxiliary power and control devices (such as sensors, electronic control unit, or wirings) fail. The second state is a force multiplication state in which a suitable degree of auxiliary force according to computer instructions is added to the operating force from the pedal 2. The third state is an antilock state in which the operating force from the brake pedal 2 is suitably decreased according to computer instructions. The fourth state is an automatic brake state in which a suitable degree of braking force according to computer instructions is exerted by auxiliary power alone.

In the embodiment shown in FIG. 1, the aforesaid control is performed on all the 4 wheels individually. However, it is not always necessary to individually control the wheels. For example, if the wheels are interrelated in groups of two using the same operating channel for each group, a total of two operating channels are required. In this case, the control is performed with respect to the individual operating channels, whereby the number of actuators and control valves will be provided according to the number of operating channels.

As for the control valves, simple 4-port 3-position valves may be controlled by known pulse width modulation technique. However, for more reliable and smoother control, it is preferable to use directional flow control valves. There are many known directional flow control valves, including servo valves and proportional solenoid valves. Further, the rotary type control valve disclosed in Japanese Patent Application No. 182997/1984 made by the same inventor as the inventor of this invention can be advantageously used in such directional flow control valve.

FIG. 3 shows another example of an actuator and its related arrangement used in this invention. In addition, the same numerals as those used in FIG. 2 indicate the same or corresponding portions.

While the example shown in FIG. 2 uses a directional flow control valve as the control valve 10a, the example shown in FIG. 3 uses three two-port two-position valves as control valves. Directional flow control valves such as those described above are relatively expensive, but two-port two-position valves as shown in FIG. 3 are relatively inexpensive. In this embodiment three valves are required for each operating channel. However, since this type of valve is inexpensive, their use is advantageous as compared to the apparatus disclosed in Japanese Patent Application No. 9791/1977. Besides one valve can be saved for each channel.

With these valves, it is also possible to achieve a smooth control by pulse width modulation.

In the example shown in FIG. 3, since two-port two-position valves 34, 35 and 36 are employed, the actuator 37 is arranged as follows. The auxiliary pressure receiving surface areas 39 and 40 of the piston 38 differ from each other. The surface area 39 is larger than the surface area 40. When the auxiliary pressure acts on surface area 39 the auxiliary pressure is effective in the same direction as the first pressure from the master cylinder 3, whereby the auxiliary pressure is added to the first pressure. When the auxiliary pressure acts on surface area 40 the auxiliary pressure is effective in the opposite direction, whereby the auxiliary pressure is deducted from the first pressure. The control valve 36 is disposed between a surface 39 having a relatively large area and a low pressure side auxiliary power circuit or line 9a. The control valve 34 is disposed betwen a surface 40 having a relatively small area and a hydraulic circuit 8a from the auxiliary power source or pump 12. Further, the control valve 35 forms a bypass passage between the large surface area 39 and the small surface area 40.

In FIG. 3 the valve 34 is closed and the valves 35 and 36 are open. Hence, liquid under pressure cannot flow from the pump 12 through the closed valve 34 to the surface 40. When the valve 34 is opened, pressurized liquid is applied to the surface 40. Simultaneously, liquid can flow through the open bypass valve 35, through the open valve 36 and the line 9a back into the tank 11. However, when the bypass valve 35 is closed, liquid cannot return to the tank 11, but liquid can still flow from the large surface 39 through the open valve 36 through line 9a back to the tank 11. Closure of the valve 36 stops this return flow to the tank 11. The operating force on the large area side can be controlled by operating the control valves 34 and 36 from the illustrated state with the control valve 35 maintained open. In this case, since the pressure on the large area side is equal to the pressure on the small area side, an operating force corresponding to the difference between the areas is produced. On the other hand, the operating force on the small area side can be controlled by operating the control valves 34 and 35 from the illustrated state with the control valve 36 maintained open. In this case, since the pressure on the large area side is in the low pressure state, an operating force is produced on the small area side.

What is claimed is:

1. An automobile braking force control apparatus for controlling the braking forces applied to any one of a number of wheel brakes individually and in groups, comprising an operator operable means such as, a brake pedal (2) for providing a first brake operating force, a master cylinder (3) connected to said brake pedal for converting said first brake operating force from said brake pedal (2) into a first hydraulic pressure, actuator means including actuator pistons for operating a respective wheel brake of said wheel brakes, operating channels (6a, 6b, 6c, 6d) leading from said master cylinder to said wheel brakes for supplying said first hydraulic pressure to said actuator pistons, an auxiliary pressure source for supplying a second auxiliary hydraulic pressure, auxiliary power circuits connecting said auxiliary pressure source to said actuator pistons of actuator means, control valves disposed in said auxiliary power circuits and controlled by an electronic control device, for limiting said second, auxiliary pressure to suitable pressure magnitudes which are effective on said actuator pistons in combination with the first hydraulic pressure from said master cylinder (3) in both positive and negative directions for said braking force control.

2. The automobile braking force control apparatus of claim 1, wherein said control valves are directional flow control valves.

3. The automobile braking force control apparatus of claim 1, wherein each wheel of an automobile is controlled individually.

4. The automobile braking force control apparatus of claim 1, wherein said actuator piston has active surface areas for receiving said auxiliary hydraulic pressure, said active surface areas differing in size from each other, one active surface area being located on a first piston side where the auxiliary pressure acts in the same direction as the hydraulic pressure from said master cylinder, the other active surface area being located on a second piston side where the auxiliary pressure acts in the opposite direction as the pressure from said master cylinder, and wherein said control valves comprise a first on-off control valve (35) connected between said first and second piston sides to form a bypass, a second on-off control valve (34) connected between said second piston side and said auxiliary pressure source, and a third on-off control valve (36) connected between said first piston side and a tank of said auxiliary pressure source.

5. An apparatus for controlling brake forces applied to wheel brakes in an automobile, comprising operator operable operating means such as a brake pedal for providing main braking power, a plurality of brake control channels, each control channel including at least one brake operating actuator for operating a respective wheel brake of said wheel brakes, master cylinder means (3) connected to said plurality of brake control channels for distributing said main braking power of said operating means to each of said actuators in the form of a main fluid pressure, an auxiliary power source for providing an auxiliary fluid pressure, an electronic control means for providing control signals, sensor means connected to inputs of said electronic control means for feeding information to said electronic control means, and control valve means electrically connected to said electronic control means and provided in each control channel for controlling the fluid pressure supplied by said auxiliary power source to any one of said actuators in response to said control signals from said electronic control means, each actuator having a piston (20, 38) comprising a plurality of working surface areas including a first working surface area exposed to said main fluid pressure from said master cylinder means, a second working surface area facing in a direction opposite to a facing direction of said first working surface area, said second working surface area being exposed to a pressure applied to said wheel brake, and a third working surface area facing in the same direction as said first working surface area, said third working surface area being exposed to pressure controlled by said control valve.

6. The apparatus of claim 5, wherein said piston of said actuator is provided with a fourth working surface area facing in a direction opposite to the facing direction of said first working surface area, said fourth surface area being exposed to pressure controlled also by said control valve.

7. The automobile braking force control apparatus of claim 4, wherein said active surface area of said piston is larger on said first piston side than on said second piston side.

8. An automobile braking force control apparatus for controlling the braking forces applied to any one of a number of wheel brakes individually and in groups, comprising an operator operable means such as a brake pedal (2) for providing a first brake operating force, a master cylinder (3) connected to said brake pedal for converting said first brake operating force from said brake pedal (2) into a first hydraulic pressure, actuator means including actuator pistons for operating a respective wheel brake of said wheel brakes, operating channels (6a, 6b, 6c, 6d) leading from said master cylinder to said wheel brakes for supplying said first hydraulic pressure to said actuator pistons, an auxiliary pressure source for supplying a second, auxiliary hydraulic pressure, auxiliary power circuits connecting said auxiliary pressure source to said actuator pistons of said actuator means, control valve disposed in said auxiliary power circuits and controlled by an electronic control device for limiting said second, auxiliary pressure to suitable pressure magnitudes which are effective on said actuator pistons in combination with the first hydraulic pressure from said master cylinder (3) in both positive and negative directions for said braking force control, wherein said actuator piston has active surface areas for receiving said auxiliary hydraulic pressure, said active surface areas differing in size from each other, one active surface area being located on a first piston side where the auxiliary pressure acts in the same direction as the hydraulic pressure from said master cylinder, the other active surface area being located on a second piston side where the auxiliary pressure acts in the opposite direction as the pressure from said master cylinder, and wherein said control valves comprise a first on-off control valve (35) connected between said first and second piston sides to form a bypass, a second on-off control valve (34) connected between said second piston side and said auxiliary pressure source, and a third on-off control valve (36) connected between said first piston side and a tank of said auxiliary pressure source.

* * * * *

UNITED STATES PATENT AND TRADEMARK OFFICE
CERTIFICATE OF CORRECTION

PATENT NO. : 4,693,521

DATED : September 15, 1987

INVENTOR(S) : Koji Takata, Yukinori Nishiyama

It is certified that error appears in the above-identified patent and that said Letters Patent is hereby corrected as shown below:

On the title page
[57] Abstract, line 14, replace "controled" by --controlled--;

Column 8, Claim 6, line 2, replace "isprovided" by --is provided--;

Column 8, Claim 8, line 17, replace "valve" by --valves--.

Signed and Sealed this

Fifteenth Day of March, 1988

Attest:

DONALD J. QUIGG

*Attesting Officer*     Commissioner of Patents and Trademarks